(12) United States Patent
Song

(10) Patent No.: US 10,404,835 B2
(45) Date of Patent: Sep. 3, 2019

(54) HYBRID CLIENT-SERVER DATA PROVISION

(71) Applicant: Google Inc., Mountain View, CA (US)

(72) Inventor: Sheng Song, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/512,491

(22) PCT Filed: Mar. 17, 2016

(86) PCT No.: PCT/US2016/022871
§ 371 (c)(1),
(2) Date: Mar. 17, 2017

(87) PCT Pub. No.: WO2017/160295
PCT Pub. Date: Sep. 21, 2017

(65) Prior Publication Data
US 2017/0331925 A1    Nov. 16, 2017

(51) Int. Cl.
*H04L 29/06*    (2006.01)
*G06F 17/30*    (2006.01)
(Continued)

(52) U.S. Cl.
CPC .............. *H04L 67/42* (2013.01); *G06F 16/95* (2019.01); *G06F 16/957* (2019.01);
(Continued)

(58) Field of Classification Search
CPC .............. H04L 65/608; H04L 67/2838; H04L 67/2833; H04L 67/42; H04L 29/06047;
(Continued)

(56) References Cited

U.S. PATENT DOCUMENTS

| 8,406,739 B2 | 3/2013 | Hull et al. |
| 8,589,515 B2 * | 11/2013 | Johnson ................. G06F 9/542 709/217 |

(Continued)

FOREIGN PATENT DOCUMENTS

| JP | 2002-373149 A | * 12/2002 |
| WO | WO-2005/041035 | 5/2005 |
| WO | WO-2015/069964 | 5/2015 |

OTHER PUBLICATIONS

International Search Report and Written Opinion on PCT/US2016/022871 dated Nov. 8, 2016.

(Continued)

*Primary Examiner* — Abdulkader M Alriyashi
(74) *Attorney, Agent, or Firm* — Foley & Lardner LLP; Daniel Rose

(57) ABSTRACT

An implementation of a method for hybrid client-server data provision involves requesting, by an application executed by a client device from a plurality of content provider software development kits (SDKs) integrated with the application, an item of content for display by the client device. The method further involves processing, by a plurality of request adaptors of the content provider SDKs, the request for potential submission to a plurality of content provider servers, thereby generating a plurality of processed requests. The method further involves receiving, by an interceptor module of a mediation SDK integrated with the application from the plurality of content provider SDKs, a plurality of processed requests. The method further involves batching, by a consolidator module of the mediation SDK, the plurality of processed requests into a batch request, the batch request including content provider priority information. The method further involves transmitting, by the mediation SDK, the batch request to a mediation server for mediation of the batch request to the plurality of content provider servers (Continued)

based on the content provider priority information, and receiving, by the mediation SDK, at least one item of content from the mediation server for display by the client device.

14 Claims, 5 Drawing Sheets

(51) Int. Cl.
    *H04L 29/08*     (2006.01)
    *G06F 16/95*     (2019.01)
    *G06F 16/957*    (2019.01)
    *G06F 16/16*     (2019.01)
    *G06F 8/30*      (2018.01)

(52) U.S. Cl.
    CPC ........ *H04L 65/4084* (2013.01); *H04L 65/608* (2013.01); *H04L 67/2833* (2013.01); *H04L 67/2838* (2013.01); *G06F 8/30* (2013.01); *G06F 16/16* (2019.01); *H04L 29/06047* (2013.01)

(58) Field of Classification Search
    CPC ........... H04L 65/4084; G06F 17/30115; G06F 17/30861; G06F 16/95; G06F 16/957; G06F 16/16; G06F 8/30
    See application file for complete search history.

(56) References Cited

U.S. PATENT DOCUMENTS

| | | | | |
|---|---|---|---|---|
| 2002/0196793 | A1* | 12/2002 | Samba | H04L 29/06 370/401 |
| 2007/0050477 | A1* | 3/2007 | Isaacs | H04L 67/02 709/219 |
| 2009/0063262 | A1 | 3/2009 | Mason | |
| 2010/0228642 | A1 | 9/2010 | Baker et al. | |
| 2011/0202730 | A1* | 8/2011 | Sonoda | H04L 63/0815 711/141 |
| 2012/0117458 | A1* | 5/2012 | Holloway | G06Q 30/0251 715/234 |
| 2012/0226552 | A1 | 9/2012 | Seenichamy | |
| 2014/0074912 | A1* | 3/2014 | Nishimoto | H04L 29/06047 709/203 |
| 2014/0101235 | A1* | 4/2014 | Smedberg | G06F 17/2235 709/203 |
| 2015/0067024 | A1* | 3/2015 | Nesbitt | G06F 17/30902 709/203 |
| 2017/0004020 | A1* | 1/2017 | Chen | G06F 9/541 |

OTHER PUBLICATIONS

Communication Pursuant to Article 94(3) EPC for EP Application No. 16 715 392.3.

* cited by examiner

HYBRID CLIENT-SERVER DATA PROVISION

CROSS-REFERENCE TO RELATED PATENT APPLICATION

The present application is a national stage entry of and claims the benefit of and priority to PCT/US2016/022871, titled "HYBRID CLIENT-SERVER DATA PROVISION" filed Mar. 17, 2016, the entire contents of which are incorporated herein by reference.

BACKGROUND

Publishers may request content from multiple third-party content providers. This can be problematic in terms of computing resources on a client device running an application, e.g. memory used in opening multiple network connections to transmit the plurality of requests. It can also create problems in terms of latency, especially when the network is a mobile network such as a 3G or 4G network. There can be a significant delay or lag between sending out the multiple requests and receiving a response by the client device.

SUMMARY

Implementations described herein relate to mediation of requests to provide data. The methods described in this Application can, among other things, help ameliorate the problems presented by multiple content requests by having a mediation SDK batch multiple requests as one batch request on the client device and transmit only a single batch request to a mediation server in order to obtain content from at least one of the third-party content providers.

One implementation relates to a method for hybrid client-server data provision. In this implementation, the method comprises requesting, by an application executed by a client device from a plurality of content provider software development kits (SDKs) integrated with the application, an item of content for display by the client device. The method further comprises processing the request for an item of content, by a plurality of request adaptors of the content provider SDKs, for potential submission to a plurality of content provider servers, thereby generating a plurality of processed requests. The method further comprises receiving, by an interceptor module of a mediation SDK integrated with the application from the plurality of content provider SDKs, a plurality of processed requests. The method further comprises batching, by a consolidator module of the mediation SDK, the plurality of processed requests into a batch request, the batch request comprising content provider priority information. The method further comprises transmitting, by the mediation SDK, the batch request to a mediation server for mediation of the batch request to the plurality of content provider servers based on the content provider priority information. The method further comprises receiving, by the mediation SDK, at least one item of content from the mediation server for display by the client device.

In some of these implementations, the processing the request for potential submission to a plurality of content provider servers comprises including proper header information for one of the plurality of content provider servers.

In some of these implementations, the content provider priority information comprises a priority ranking of content provider servers In some of these implementations, the content provider priority information is provided to the mediation SDK by the application.

In some of these implementations, an analysis engine of the mediation SDK selects a single item of content from the at least one item of content to display by the client device based on the content provider priority information.

In some of these implementations, the at least one item of content for display received from the mediation server is the only item of content for display received from the mediation server, the at least one item of content for display being a highest priority item of content for display based on the content provider priority information that the mediation server was able to obtain.

In some of these implementations, the batch request further comprises timing information related to a maximum acceptable time for response from the mediation server.

In some of these implementations, the mediation of the batch request is based at least in part on the timing information.

In some of these implementations, the interceptor module intercepts the processed requests.

In some of these implementations, the interceptor module intercepting the processed requests comprises the content provider SDKs using a callback interface of the mediation SDK.

In some of these implementations, the interceptor module intercepting the processed requests comprises blocking calls by the content provider SDKs to the content provider servers.

One implementation relates to a method for hybrid client-server data provision. In this implementation, the method comprises receiving, by a mediation server, a batch request for an item of content for display by a client device from a mediation software development kit (SDK), the batch request having been generated by a consolidator module of the mediation SDK based on a plurality of processed requests for an item of content processed by a plurality of content provider SDKs on the client device, the batch request comprising content provider priority information. The method further comprises processing, by a deconstruction engine of the mediation server, the batch request to generate a plurality of content-provider-specific requests. The method further comprises transmitting, by the mediation server to a plurality of content provider servers, the plurality of content-provider-specific requests. The method further comprises receiving, by the mediation server from the content provider servers, at least one item of content responsive to at least one of the content-provider-specific requests, and storing the item of content in a content storage of an analysis module of the mediation server. The method further comprises selecting, by the analysis module of the mediation server, at least one stored item of content for transmission. The method further comprises transmitting, by the mediation server to the mediation SDK, the selected item of content.

In some of these implementations, the transmitting the selected item of content occurs after a predetermined timeout period.

In some of these implementations, the batch request further comprises timing information.

In some of these implementations, the transmitting the selected item of content occurs after a timeout period established by the analysis module based on the timing information.

In some of these implementations, the selecting at least one stored item of content for transmission includes selecting a plurality of stored items of content for transmission.

In some of these implementations, the selecting at least one stored item of content for transmission is based on the content provider priority information.

In some of these implementations, the method further comprises intercepting, by an interceptor module of the mediation SDK, the plurality of processed requests.

In some of these implementations, the interception by the interceptor module comprises using, by the content provider SDKs, a callback interface of the mediation SDK.

In some of these implementations, the interception by the interceptor module comprises blocking calls by the content provider SDKs to the content provider servers.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
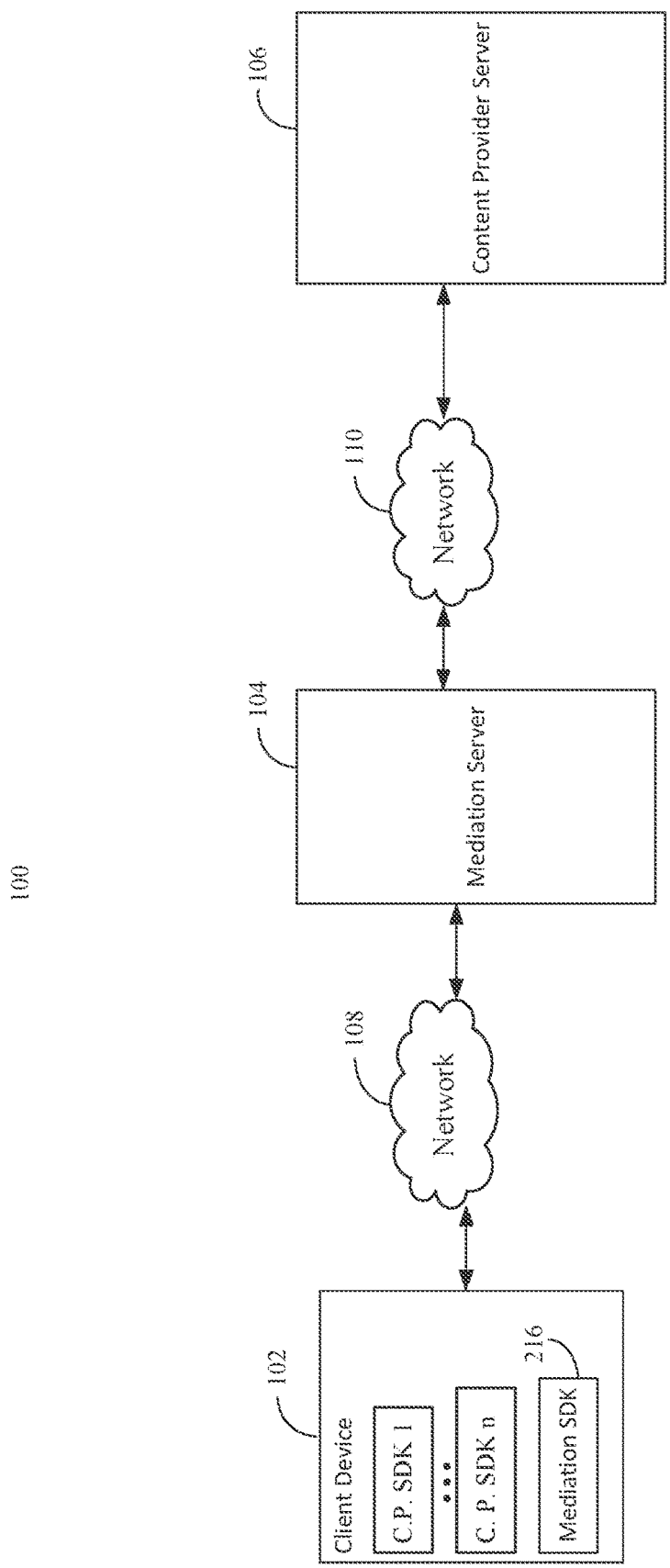
FIG. 1 is an overview depicting a general architecture that can be used in an implementation of a method for hybrid client-server data provision.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods of hybrid client-server content provision. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can view a resource, such as a webpage, a document, an application, etc. In some implementations, the computing device may access the resource via the Internet by communicating with a server, such as a webpage server, corresponding to that resource. The resource may be provided by a single server, or may be provided by multiple servers. For example, in some implementations a resource may be available from a plurality of servers and the computing device may request the resource from two or more of the servers, with the resource being provided to the computing device by, for example, a first of the plurality of servers to respond to a request for the resource. Additionally or alternatively, the resource may include different content that may be provided by different servers. For example, first party content of the resource may be provided from a first server and additional third party content of the resource may be provided by a plurality of further servers such that first party content of the resource may be provided from the first server, and third party content of the resource may be provided by one or more of the further servers based upon a predetermined criterion. Provision of content from multiple servers in this way allows, for example, a server to be selected for provision of content based upon a predetermined criterion such as, for example, quickest provision of content to the computing device.

Provision of content from multiple servers may additionally be used to provide content to a computing device (e.g., a client device) viewing or executing data by way of an application, such as a mobile application. Similarly to the viewing of a resource such as a webpage described above, content associated with the application may be available from multiple servers and the content may be requested by the computing device from multiple servers with the content associated with the application being provided by one of the servers based upon a predetermined criterion, or first-party content may be provided by a first-party content provider and additional third-party provided content may be requested from a plurality of third party content providers with the third party provided content being provided by a third party content provider based upon a predetermined criterion. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device identifier may be configured to store and/or cause the client device to transmit information related to the client device to the content item selection system and/or resource server (e.g., values of sensor data, a web browser type, an operating system, historical resource requests, historical content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

As previously mentioned, the computing device (e.g., a client device) may also be used to view or execute an application, such as a mobile application. The application may include first-party content that is the subject of the application from a first-party content provider and may also include additional third-party provided content. In one implementation, responsive to use of the application, a resource server and/or a client device can communicate with a data processing system, such as a content item selection system, to request a content item to be presented with a user interface of the application and/or otherwise.

The request may be a request for multiple third-party content providers, with the goal of having at least one or a plurality of third-party content providers provide at least one or a plurality of content items, at least one or a plurality of which can be presented to a user on a user interface of the application. These requests may need to be processed before being served on the third-party content providers. For example, the request might be an HTTP GET request, and the request might need e.g. an appropriate IP header, proper setting of query parameters, or other requirements, before it can be served on a third-party content provider. Such processing can be handled using SDKs integrated with the application. The SDKs may, but need not, be provided by third-party content providers for use by a developer of the application.

In some instances, as described above, the application may request content from multiple third-party content providers in order to obtain content from one of the third-party content providers that satisfies a predetermined criterion, for example a third-party content provider that is able to provide content most quickly.

It will be appreciated that a large number of requests may be required to be sent out by, e.g., an application requesting content from multiple servers. This can be problematic in terms of computing resources on a client device running an application, e.g. memory used in opening multiple network connections to transmit the plurality of requests. It can also create problems in terms of latency, especially when the network is a mobile network such as, for example, a 3G or 4G network. There can be a significant delay or lag between sending out the multiple requests and receiving a response by the client device. The methods described in this Application can, among other things, help ameliorate at least this problem by having a mediation SDK batch the multiple requests as one batch request on the client device and then transmit only a single batch request to a mediation server in order to instantiate provision of content to the client device. In this way, content can be provided to the client device from one of a plurality of content sources so as to receive content more effectively whilst avoiding the problems associated with computing resources on the client device and latency discussed above.

FIG. 1 is an overview depicting a general architecture of a system 100 that can be used in an implementation of a method for hybrid client-server content provision. Client device 102, which can include one or more devices such as a computer, laptop, desktop, smart phone, tablet, personal digital assistant, set-top box for a television set, a smart television, or server device configured to communicate with other devices via e.g. a network 108. The client device can include one or a plurality of content provider SDKs, such as content provider SDK 1 and content provider SDK n, as well as a mediation SDK, described in more detail below.

In an implementation, the system 100 includes the network 108 and the network 110, which each may include a local area network (LAN), wide area network (WAN), a wireless link, an intranet, the Internet, or combinations thereof. The system 100 further includes a mediation server 104 and a content provider server 106, described in more detail below.

Figure 2:
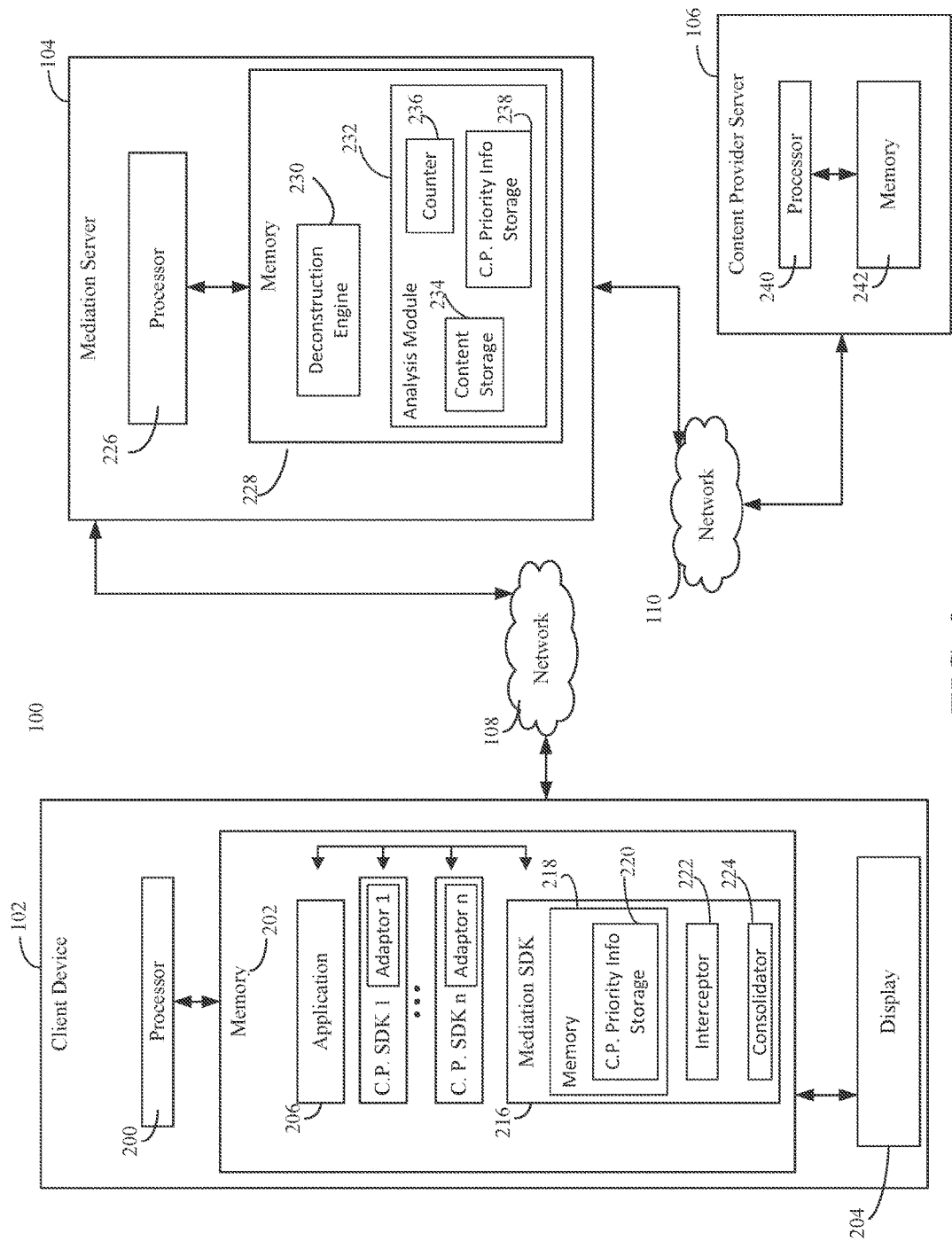
FIG. 2 is a detailed view of components used in an implementation of a method for hybrid client-server data provision.

FIG. 2 shows some of the components, devices, and networks that can be used in a system 100 that can be used in an implementation of a method for hybrid client-server data provision.

The system 100 can include a client device 102. The client device 102 can include one or more devices such as a computer, laptop, desktop, smart phone, tablet, personal digital assistant, set-top box for a television set, a smart television, or server device configured to communicate with other devices via e.g. the network 108. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript, C, C++, C#, HTML, Java, JavaScript, Perl, Python, Visual Basic, and XML.

The client device 102 can execute a software application 206 (e.g., a web browser or other application) to retrieve content from other computing devices over network 108. In some cases, an application running on the client device 110 may be e.g., a game, a media player, etc. In one implementation, the client device 102 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors 200 of the client device executing the instructions from the web browser application may request data from another device connected to the network 108 referred to by the URL address (e.g., mediation server 104). The other device may then provide web page data and/or other data to the client device 102, which causes visual indicia to be displayed by the display 204 of the client device 102.

The application 206 can initiate a request for an item of content from multiple content providers, such as content provider 108. This can include request 1, 2, . . . , n for an item of content provided by content providers 1, 2, . . . . n. The request may require processing before it can be served on the content providers, as discussed above. In an implementation, the request is sent to each of a number of content provider SDKs, such as content provider SDK 1, content provider SDK 2, . . . through content provider SDK n, each of which can be integrated with the application. The SDKs can comprise a set of software development tools such as, for example, a library, an API, and/or a hardware platform. Content provider SDK 1 is associated with content provider 1 such that it is capable at least of processing a request for an item of content such that it may be served on content provider 1. Similarly, content provider SDK n is associated with content provider n such that it is capable at least of processing a request for an item of content such that it may be served on content provider n. The processing can be handled by an adaptor of a content provider SDK, e.g. adaptor 1 of content provider SDK 1. The adaptor can, for example, ensure that the request has a proper header for submission to a specific content provider.

In an implementation, after processing requests as described above, content provider SDKs do not transmit the processed request to a content provider. Rather, after processing requests as described above, the processed requests are intercepted by a mediation SDK 216 via an interceptor module 222. In an implementation, the interceptor module 222 may be integrated with the content provider SDKs such that it provides a well-defined callback interface, and instead of the content provider SDKs initiating contact with their respective content provider servers, the processed request is passed along to the interceptor module e.g. for eventual batching. In an implementation, interception can additionally or alternatively be implemented on a lower network level such that HTTP calls to content provider servers from the content provider SDKs are blocked. For example, they may be blocked using packet inspection filtering. The mediation SDK 216 can comprise a set of software development tools such as, for example, a library, an API, and/or a hardware platform. In an implementation, mediation SDK 216 includes a memory 218, which includes a content priority information storage 220. Mediation SDK 216 also includes, in an implementation, a consolidator module 224. The mediation can be integrated with the application 206 and/or any or all of the content provider SDKs 1 through n.

The content provider priority information storage can, for example, store content provider priority information such as, e.g., a priority ranking, or other information useful for determining how effectively different content providers provide content. For example, the data may indicate an average connection speed or latency for each content provider, or data indicating a quality of the content that is provided such as a compression rate of content provided from each content provider.

In an implementation, the interceptor module 222 can be integrated via, e.g., code in the application as well as in the individual content provider SDKs 1 through n, such that the content provider SDKs transmit the processed requests, described above, to the interceptor module 222. In an implementation, the consolidator module 224 then processes any and all processed requests and generates a single batch request. The batch request comprises some or all information necessary for a mediation server 104 to reconstruct the processed requests processed by content provider SDKs 1 through n. It also comprises content provider priority information stored in content provider priority information storage 220.

In an implementation, the batch request is sent over network 108 to mediation server 104 via a network interface of mediation SDK 216. Network 108 may include a local area network (LAN), wide area network (WAN), a wireless link, an intranet, the Internet, or combinations thereof. Due to the fact that only a single request is being transmitted over network 108, the latency issues often seen when attempting to mediate multiple requests for content are greatly ameliorated as there is less of a load on the network interface of mediation SDK 216 and less of a load on network 108.

In an implementation, the batch request is received by a network interface of mediation server 104. Mediation server 104 can include a computing device, such as a server, configured to host a resource, such as a web page or other resource (e.g., articles, comment threads, music, video, graphics, search results, information feeds, etc.). Mediation server 104 may be a computer server (e.g., a file transfer protocol (FTP) server, file sharing server, web server, etc.) or a combination of servers (e.g., a data center, a cloud computing platform, etc.). Mediation server 104 can provide resource data or other content (e.g., text documents, PDF files, and other forms of electronic documents) to the client device 102.

In an implementation the batch request is processed by a deconstruction engine 230 of the mediation server 104 stored in memory 228 of the mediation server. The deconstruction engine is pre-configured to be able to deconstruct a batch request generated by mediation SDK 216 into a plurality of processed requests corresponding to the processed requests processed by content provider SDKs 1 through n. Each of the plurality of processed requests is suitable for submission to a content provider, as discussed above.

In an implementation, mediation server also has an analysis module 232 stored in memory 228. The analysis module has a content storage 234, a counter 236, and a content provider priority information storage 238, which are discussed below.

The mediation server can transmit the processed requests by a network interface through network 110 to particular content provider servers (network 110 may include a local area network (LAN), wide area network (WAN), a wireless link, an intranet, the Internet, or combinations thereof). For example, a processed request that corresponds to a request processed by content provider SDK 1 can be transmitted to content provider server 1. A processed request that corresponds to a request processed by content provider SDK 2 can be transmitted to content provider server 2, and so on, through to a processed request that corresponds to a request processed by content provider SDK n can be transmitted to content provider server n. In this way, requests corresponding to the initial requests made by the application 206 on client device 102 can be properly processed and served on appropriate content provider servers.

A content provider server, e.g. content provider server 108 as seen in FIG. 2, can respond to a request such as the requests discussed above and transmit an item of content to mediation server 104 through network 110. This item of content can then be stored in content storage 234. In one implementation, the analysis module 232 of the mediation server 104 processes the received item(s) of content. The analysis module has data stored that allows it to determine how many responses are expected. This data can be provided by, e.g., the deconstruction engine after it has processed the batch request. As the mediation server receives items of content from content providers, the items may be transmitted to the mediation SDK 216 as the content is received such that content may be provided to the client device with the time between the request for the content and the provision of content to the device minimized. Alternatively, the content may be stored in content storage 234, as discussed above, and a counter 236 may be incremented for each item of content stored. If the mediation server receives, e.g., notification from a content provider that it is unable or unwilling to provide an item of content, the counter 236 can also be incremented. In some implementations counter 236 can be used by the analysis module 232 to determine, e.g., when all the expected responses have been accounted for. The analysis module 232 can then transmit, or can have the mediation server 104 transmit, or can have any component or module of the mediation server transmit, via network 108, the stored items of content to the mediation SDK 216. Alternative or additionally, the stored items of content may be transmitted to the client device 102, or to any component or module of the client device 102. Once transferred to the client device, the mediation SDK 216, or the application 206, or the client device or any component or module of the client device, in combination or otherwise, can determine which item of content to display. This determination may be based on the content provider priority information. For example, an item of content provided by a content provider determined to be the highest quality content may be selected.

The analysis module 232 can, instead of transmitting all stored items of content, determine which single item of content should be displayed and transmit only that item of content to, e.g., the mediation SDK. This determination may be based on the content provider priority information stored in content provider priority information storage 238. For example, a quality of the provided content may be determined based upon the priority information, e.g. based on historical data as to the quality provided by the content provider, and the analysis module may wait for additional data for a predetermined time if the quality does not meet a predetermined criterion. If the predetermined time is exceeded, the analysis module may transmit content that has been received that has a highest quality.

In one implementation, the analysis module 232 dynamically selects and transmits a highest overall priority item of content once it is stored in content storage 234 without waiting for all transmitted requests to be accounted for in the manner described above. This may be implemented by having the analysis module determine a highest overall priority content provider based on the content provider priority information. An item of content stored in content storage 234 that was received from this content provider is tagged by the analysis module 232 as being a highest overall priority item of content. In an implementation, once that item of content is so tagged, it is immediately transmitted to e.g. the mediation SDK 216, which in turn can display it. This allows the analysis module 232 to cut short the overall process of providing the highest priority item of content because it does not have to wait on receiving and storing items of content that are of lower priority than the highest overall priority item of content.

In another implementation, the analysis module 232 uses a timeout period to set a maximum amount of time in which an item of content from a content provider may be received. The timeout period may be based, e.g., on timing information related to a maximum acceptable time for response from mediation server 104. The batch request transmitted by mediation SDK 216 may comprise this timing information. For example, the analysis module 232 may start a timer when it transmits a first processed request to a content provider n corresponding to the processed request processed by content provider SDK n. This timer is continuously compared to a timeout period determined by analysis module 232 based on the timing information. Alternatively, the timeout period may correspond to a pre-determined value stored on the mediation server. The timeout period may be any amount of time, but is preferably no longer than one second.

In an implementation, once the timer has counted an amount of time surpassing the fixed timeout period, the analysis module 232 transmits the stored items of content to the Mediation SDK 216 over network 108. The analysis module can also transmit a single item of content that it determines to be the highest priority item of content of the items of content stored in content storage 234 in the manner described above.

Figure 3:
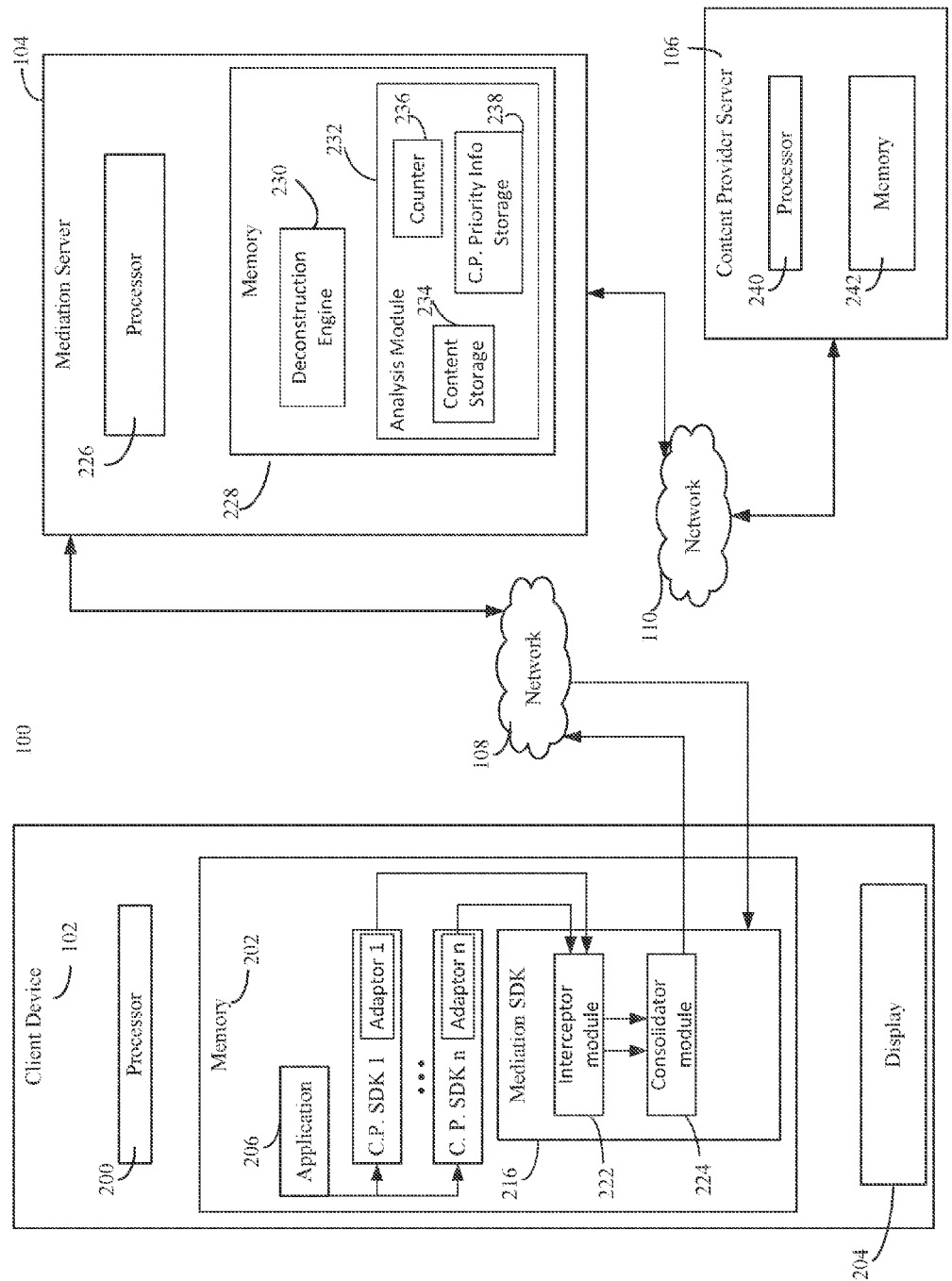
FIG. 3 is a detailed view of some of the interactions between those components in an implementation of a method for hybrid client-server data provision.

FIG. 3 shows some of the interactions between components of system 100 in an implementation of a method for hybrid client-server data provision. In this figure, arrows generally representing requests for an item of content, in either a processed, unprocessed, batched, or other state. In an implementation, two requests originate from application 206, one going to content provider SDK 1, the other going to content provider SDK n. Adaptor 1 and adaptor n each process their respectively received requests and output processed requests that are in proper format for submission to a content provider server, e.g. the processed request processed by adaptor 1 has the appropriate header information for submission to content provider 1 and the processed request processed by adaptor n has the appropriate header information for submission to content provider n.

In an implementation, the interceptor module 222, integrated with either the application or the content provider SDKs or both, receives these two processed requests. The consolidator module 224 batches these requests together as a single batch request, which comprises content provider priority information, and transmits the single batch request (represented by a single arrow) through network 108 to mediation server 104. The mediation server 104 than mediates the batch request to two content provider servers based on the content provider priority information. The mediation server 104 then transmits a single highest priority item of content back to the mediation SDK 216 through network 108, and mediation SDK 216 can display or cause to be displayed the single highest priority item of content.

Figure 4:
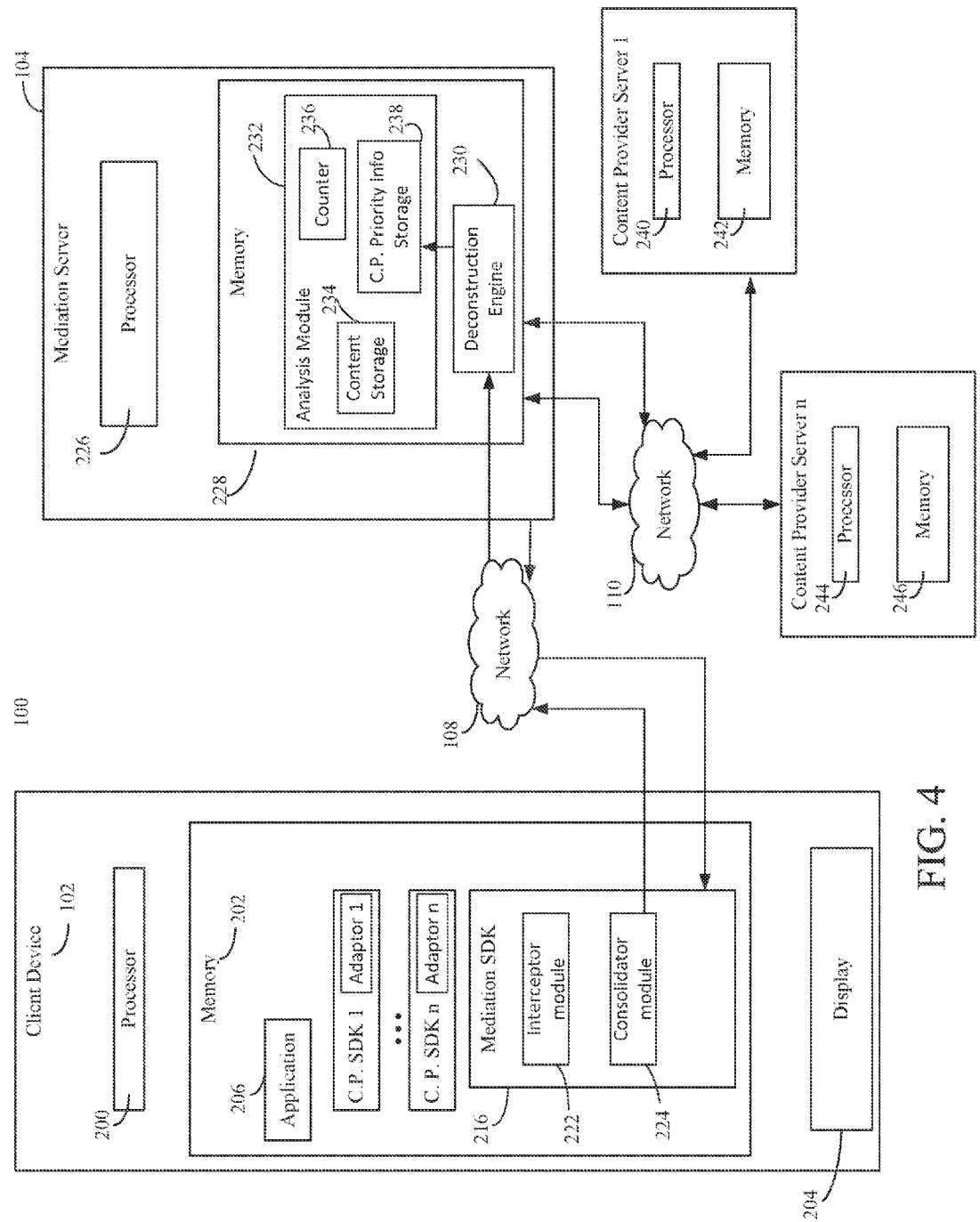
FIG. 4 is a detailed view of some of the interactions between those components in another implementation of a method for hybrid client-server data provision.

FIG. 4 shows some other interactions between components of system 100 in an implementation of a method for hybrid client-server data provision. In an implementation, mediation server 104 receives a single batch request, depicted by a single arrow, from mediation SDK 216 through network 108. The batch request is processed by deconstruction engine 230 of analysis module 232, which stores content priority information in content priority information storage 238, and transmits two requests, depicted by two arrows, through network 110, one request, corresponding to the processed request processed by content provider SDK 1, going to content provider server 1, and one request, corresponding to the processed request processed by content provider SDK n, going to content provider server n. The content provider servers return two items of content, stored in content storage 234. Analysis module 232 of the mediation server then selects and transmits both items of content from content storage 234, through network 108, to mediation SDK 216. Mediation SDK 216 can display or cause to be displayed the single highest priority item of content based on content provider priority information.

Figure 5:
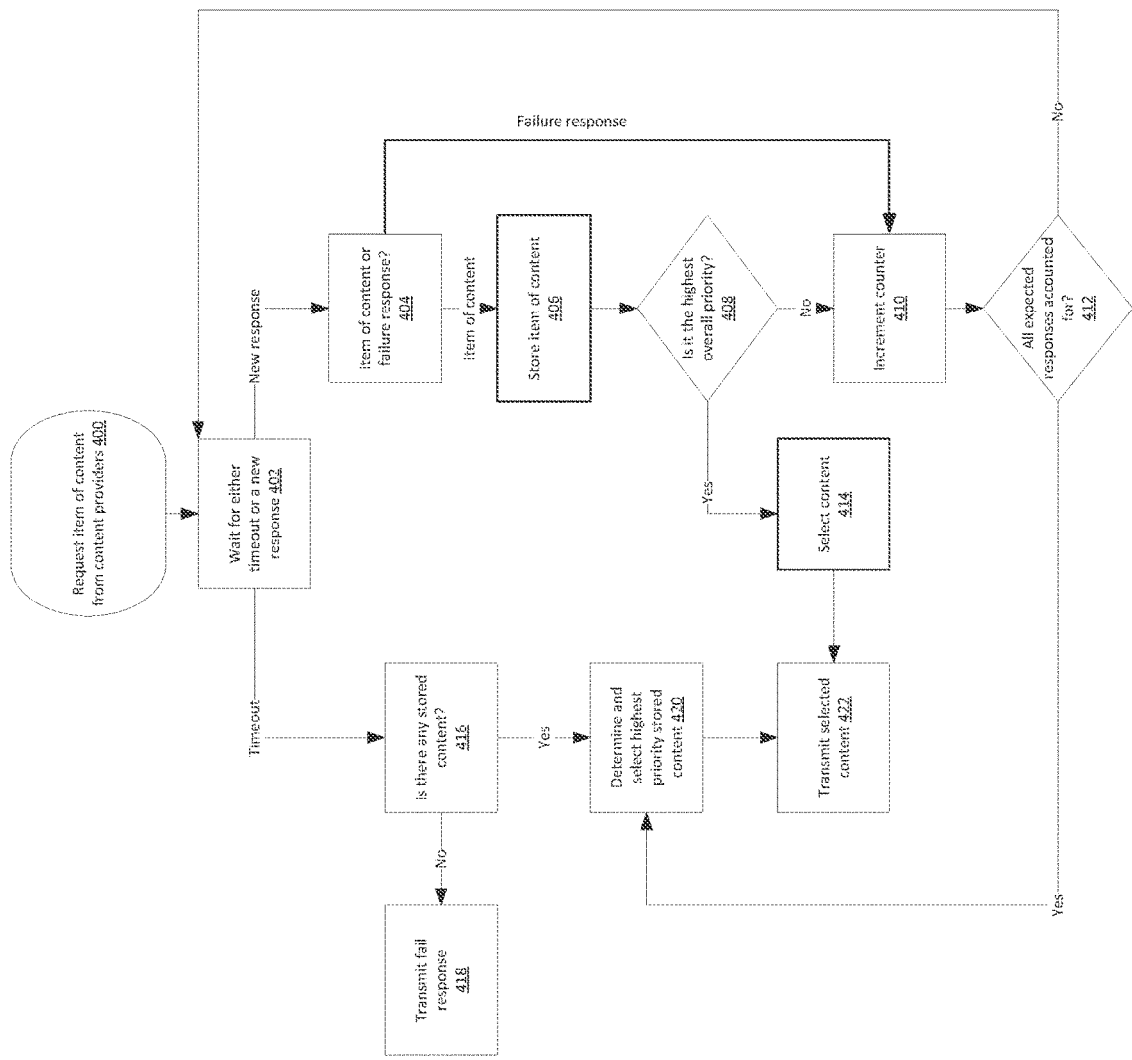
FIG. 5 is a flowchart depicting a decision making process of an analysis module of a mediation server.

FIG. 5 shows a flowchart depicting a transmission decision making process by analysis module 232. In an implementation, analysis module 232 has a predetermined timeout period. Mediation server 104 requests can item of content from a plurality of content provider servers at 400. At 402, the mediation server waits for either a timeout (based on the predetermined timeout period) or a new response, i.e. a new item of content provided by a content provider server or a failure notification. If a timeout occurs, at 416 analysis module 232 determines if there is any stored item of content in content storage 234. If there is not, then at 418 mediation server 104 transmits a fail response to mediation SDK 216 through network 108. For example, mediation server 104 might transmit a predetermined fail signal to mediation SDK 216 to trigger mediation to initiate a failure to obtain item of content procedure, e.g. displaying a predetermined item of content stored on client device 102.

If, at 416, analysis module 232 determines that there is at least one stored item of content in content storage 234, then at 420 analysis module 232 determines and selects the highest priority item of content out of any stored items of content, based on content provider priority information. At 422 the selected content is then transmitted by mediation server 104 through network 108 to mediation SDK 216.

Going back to 402, if a new response from a content provider is received by mediation server 104, i.e. a new item of content provided by a content provider server or a failure notification, then analysis module 232 determines whether the response is an item of content or a fail response. If the response is a fail response, counter 236 is incremented at 410, and at 412 analysis module 232 determines if all expected responses are accounted for based on number of expected responses information provided by deconstruction engine 230. If not, we return to 402 to wait. If all expected responses are accounted for, we proceed to 420 and proceed as described above.

Returning to 404, if the new response is determined by analysis module 232 to be an item of content, the item of content is stored in content storage 234. At 408 analysis module 232 determines if it is the highest overall priority item of content, i.e. whether it corresponds to the highest priority content provider as determined by analysis module 232 from the content provider priority information stored in content provider priority information storage 238. If it is the highest overall priority item of content, then the item of content is selected by analysis module 232 at 414 and at 422 the selected item of content transmitted by mediation server 104 through network 108 to mediation SDK 216. If, at 408, analysis module 232 determines that the item of content is not the highest overall priority item of content, then we proceed to 410 and proceed form there as described above.

As discussed above, when a large number of requests for content are transmitted by an application requesting content from multiple servers, a number of problems may arise. For example, there may be problems in terms of computing resources on a client device running an application, e.g. memory used in opening multiple network connections to transmit the plurality of requests. It may also be computing-resource intensive for a client device running the application to perform mediation of the multiple requests and responses to those requests. For example, it may be computing-resource intensive to perform analysis to determine which response to the requests for content is most preferable to a party that controls the selection of the provided content, e.g. a developer of the application. This may be especially difficult if the developer has the application makes this selection based on a plurality of factors, such as, for example, quality of content, bid amount proffered by a third-party content provider for the chance to fill an impression opportunity, or latency of a connection with a third-party content provider. An application attempting to transmit multiple requests through a network may also run in to problems in terms of latency, especially when the network is a mobile network such as, for example, a 3G or 4G network. There can be a significant delay or lag between sending out the multiple requests and receiving a response by the client device on which the application is executed. The methods of hybrid client-server data provision discussed in this Application may, among other things, help ameliorate these problems, e.g., by having a server handle the computing-resource intensive mediation of the multiple requests for content, or by leveraging a serve-to-server network connection to ameliorate the latency issue, or by any of the other advantage provided by use of these methods.

As an example, one implementation of these methods may involve a news application executed on a client device attempting to display news items. The news application may make multiple requests to news content providers for news items to display. For example, the requests may be sent to various news content providers such as, for example, CNN, NBC news, and FOX news. These requests may be sent through content provider SDKs on the client device that are integrated with the application which process the requests for submission to the content provider servers. For example, a CNN news SDK integrated with the news application may process a request intended for submission to an CNN news server that provides news items of content, an NBC news SDK integrated with the news application may process a request intended for submission to an NBC news server that provides news items of content, etc. The processed requests may then be intercepted by a mediation SDK integrated with the application and batched together. The mediation SDK may then transmit the batched request to a mediation server. The batch request may include content provider priority information. For example, the batch request may include a "quality" ranking of news providers that ranks the news provider servers based on how often the user has clicked on their provided content in the past. The batch request may alternatively or additionally include "compression" information based on the historical compression efficiency of the news provider servers in their provided content. The mediation SDK may use this content provider priority information in mediation of the multiple requests for content.

In an implementation, the batch request provides a significant advantage over the application making multiple requests for content to the news provider servers in that only a single network connection need be opened, thus preserving computing resources on the client device. Furthermore, the mediation of the multiple requests and the responses to those requests may be done on the mediation server, further preserving computing resources on the client device. The mediation server may also leverage a server-to-server network connection to communicate with the content providers, which can often provide an advantage in terms of latency and speed of response over a client-device-to-server network connection, especially when that connection is made over a mobile network such as 3G or 4G.

Another implementation of these methods may involve third-party content being requested by the application to fill an impression opportunity. An impression opportunity may be an opportunity to display on a device some content. In some implementations, third parties may pay to have their content fill the impression opportunity. In such implementations, an auction process may be implemented by the application, either directly e.g. by the application, or indirectly e.g. by a program executed on the operating system that executes the application, or by a server in communication with the application, or in any other appropriate manner. In such an auction, bids may be solicited from multiple third party content providers and one bid may be selected based on the auctioneer's criteria. Such criteria may be based on, for example, the expected latency of the connection to the content provider, the expected quality of the content provided, the monetary amount actually bid, a predicted click through rate (pCTR), a predicted conversion rate (pCVR), or any other factors that the auctioneer may wish to consider.

In some instances, the application may request content from multiple third-party content providers to fill an impression opportunity as part of a process of establishing a mediation waterfall. A mediation waterfall is a way of organizing requests for content items that help a publisher or anyone with an impression opportunity maximize the amount of money earned when selling that opportunity to a content provider. Different content providers might be willing to pay different amounts for an impression opportunity. In a mediation waterfall, a plurality of requests are sent out to content providers. The auctioneer initiating the mediation waterfall may prioritize a content provider that is estimated to be the highest paying content provider out of the group of content providers to whom a request is sent. Other requests are also sent to other content providers with the intention of accepting those content provider's proffered items of content if the higher paying content provider does not agree to provide an item of content in exchange for the requested price. Typically, but not always, the content provider estimated to be the second highest paying content provider is prioritized, and should no agreement be reached with that content provider, the content provider estimated to be the third highest paying content provider is prioritized, and so on.

In implementations where an application makes multiple requests for content with the intention of establishing a mediation waterfall, a batch request provides a significant advantage over the application making multiple requests for content to the content providers in that only a single network connection need be opened, thus preserving computing resources on the client device. Furthermore, the mediation of the multiple requests and the responses to those requests may be done on the mediation server, including having the mediation server perform the auction, further preserving computing resources on the client device. The mediation server may also leverage a server-to-server network connection to communicate with the content providers, which can often provide an advantage in terms of latency and speed of response over a client-device-to-server network connection, especially when that connection is made over a mobile network such as 3G or 4G.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for hybrid client-server data provision, comprising:
   initiating, by an application executed by a client device, a request for an item of content from a plurality of content provider servers by transmitting the request to a plurality of content provider software development kits (SDKs) integrated with the application;
   generating, by a plurality of request adaptors of the content provider SDKs, a plurality of processed requests based on the received request for the item of content for potential submission to the plurality of content provider servers;
   receiving, by an interceptor module of a mediation SDK integrated with the application, from the plurality of content provider SDKs, the plurality of processed requests;
   batching, by a consolidator module of the mediation SDK, the plurality of processed requests into a batch request, the batch request comprising content provider priority information and timing information related to a maximum acceptable time for response from a mediation server;
   transmitting, by the mediation SDK, the batch request to the mediation server for mediation of the batch request to the plurality of content provider servers based on the content provider priority information; and
   receiving, by the mediation SDK from the mediation server, a single item of content selected by the mediation server for display by the client device,
   wherein the single item of content for display received from the mediation server is a highest priority item of content for display, based on the content provider priority information, that the mediation server was able to obtain, and
   the mediation of the batch request by the mediation server includes implementing a timeout period based at least in part on the timing information.

2. The method of claim 1, wherein the plurality of processed requests include proper header information for a respective one of the plurality of content provider servers.

3. The method of claim 1, wherein the content provider priority information comprises a priority ranking of content provider servers.

4. The method of claim 1, further comprising providing, by the application, the content provider priority information to the mediation SDK.

5. The method of claim 4, wherein the single item of content is selected by the mediation server based on the content provider priority information.

6. The method of claim 1, wherein the interceptor module intercepts the processed requests.

7. The method of claim 6, wherein the interceptor module intercepting the processed requests comprises the content provider SDKs using a callback interface of the mediation SDK.

8. The method of claim 6, wherein the interceptor module intercepting the processed requests comprises blocking calls by the content provider SDKs to the content provider servers.

9. A method for hybrid client-server data provision, comprising:
    receiving, by a mediation server, a batch request for an item of content for display by a client device from a mediation software development kit (SDK), the batch request having been generated by a consolidator module of the mediation SDK based on a plurality of processed requests for an item of content processed by a plurality of content provider SDKs on the client device, the batch request comprising content provider priority information;
    processing, by a deconstruction engine of the mediation server, the batch request to generate a plurality of content-provider-specific requests;
    transmitting, by the mediation server to a plurality of content provider servers, the plurality of content-provider-specific requests;
    receiving, by the mediation server from the content provider servers, a plurality of items of content responsive to the content-provider-specific requests, and storing the items of content in a content storage of an analysis module of the mediation server;
    determining, by the mediation server, that a timeout period for receiving a response from the content provider servers has expired;
    selecting, by the analysis module of the mediation server, after the determination that the timeout period has expired, a single highest priority item of content of the stored items of content for transmission, based on the content provider priority information; and
    transmitting, by the mediation server to the mediation SDK, the selected item of content.

10. The method of claim 9, wherein the batch request received from the client device further comprises timing information, the method further comprising:
    the mediation server determining the timeout period for receiving the response from the content provider server based on the timing information.

11. The method of claim 10, wherein the timeout period is based on a predetermined value stored on the mediation server.

12. The method of claim 9, further comprising intercepting, by an interceptor module of the mediation SDK, the plurality of processed requests.

13. The method of claim 12, wherein the interception by the interceptor module comprises using, by the content provider SDKs, a callback interface of the mediation SDK.

14. The method of claim 12, wherein the interception by the interceptor module comprises blocking calls by the content provider SDKs to the content provider servers.

* * * * *